United States Patent [19]
Kuo et al.

[11] Patent Number: 5,483,227
[45] Date of Patent: Jan. 9, 1996

[54] LIQUID LEVEL CONTROLLER

[76] Inventors: Teh-Chuan Kuo; Kao-Ching Wu, both of No. 68-9, Fan Shu Rd., Ta Li Li, Tou Cheng Town, Yi Lan Hsien, Taiwan

[21] Appl. No.: 206,646

[22] Filed: Mar. 7, 1994

[51] Int. Cl.$^6$ ................................................. G08B 21/00
[52] U.S. Cl. ........................ 340/623; 340/624; 340/618; 335/17; 335/29
[58] Field of Search ..................................... 340/623, 624, 340/618; 335/17, 29; 73/307, 305, 453; 137/558; 417/20, 40, 63

[56] References Cited

U.S. PATENT DOCUMENTS

| | | | |
|---|---|---|---|
| 2,625,107 | 1/1953 | Schaefer | 103/26 |
| 2,844,678 | 7/1958 | Nielsen | 200/81.5 |
| 3,437,771 | 4/1969 | Nusbaum | 137/55 |
| 4,037,193 | 7/1977 | Uemura | 340/623 |
| 4,165,204 | 8/1979 | Nielsen | 417/40 |
| 5,124,686 | 6/1992 | White et al. | 340/624 |

Primary Examiner—John K. Peng
Assistant Examiner—Julie Lieu

[57] ABSTRACT

A liquid level controller comprises of a control circuit, a control box, a sump pump, and a liquid level indicating means, the liquid level indicating means comprising a high level indicating device and an impulse indicating device, the high level indicating device and the impulse indicating device comprising pipe bodies, magnetic switches, floating element or impulse element. The pipe body of the impulse indicating device has a connecting pipe connected to the side thereof. The magnetic switches located on the top of the pipe bodies and connected to the control circuit with electric wires. When the liquid surface raises and buoys the floating element of the high level indicating device to contact the magnetic switch, the magnetic switch produces a signal to the control circuit and the sump pump is started to draw the liquid out of the tank. The liquid is drawn through the impulse indicating device, the impulse element, of the impulse indicating device is raised by the buoyancy of the liquid to contact the magnetic switch, then the sump pump is controlled by the impulse indicating device and the liquid is drawn out until the impulse force of liquid is not strong enough to support the impulse element, that is, the liquid is completely drawn out.

4 Claims, 10 Drawing Sheets

LIQUID LEVEL CONTROLLER

BACKGROUND OF THE INVENTION

The present invention relates to a liquid level controller, and particularly to a liquid level controller that can completely draw liquid out of a liquid tank and avoid the incorrect actions caused by the impurity within the liquid to choke the liquid level controller.

Various liquid level controllers are known and widely used for sucking liquid. These liquid level controller commonly use mercury switches or electrode sensors to control the liquid level.

The mercury switches include a lever with a floating ball at the end thereof. The floating ball locates on a liquid surface and is supported by the buoyancy of the liquid. The lever only oscillates in a small and fixed region so it can't draw the liquid under the floating ball, also the floating ball device will damage easily and lose its functions, and the floating ball mechanism must be located under the liquid surface, therefore the installation, maintenance and fixing of the liquid level controller are more difficult.

The electrode sensors include a high level electrode sensor and a low level electrode sensor for detecting the high and low levels of the liquid. The electrode sensors must locate under the liquid surface therefore the installation, maintenance and fixing are more difficult. Furthermore, the electrode sensors are easily corroded by tile electric current or eroded by the impurity of the liquid to make the electrode sensors damage and lose its functions.

SUMMARY OF THE INVENTION

The present invention has been accomplished under the aforesaid circumstances. It is therefore an object of the present invention to provide a liquid level controller for completely delivering liquid out of a liquid tank.

It is another object of the present invention to provide a liquid level controller that the impurity within the liquid will not choke the liquid level controller and can act positively.

It is still another object of the present invention to provide a liquid level controller wherein the lower part of the high level indicating device is located in the liquid, so that the installation, maintenance and fixing of the liquid level controller alarm is simple and convenient.

It is still another object of the present invention to provide a liquid level controller which is simple in structure, low rate of failure and act easily.

It is still another object of the present invention to provide a liquid level controller which allows water to be completely drawn off from the liquid tank at one operation so as to minimize the operation frequency of the sump pump and the loss of starting current, reduce possible sediment in the liquid tank, and extend the service life of the liquid tank.

BRIEF DESCRIPTION OF THE DRAWINGS

The structure of the present invention may be best understood through the following detailed description of the preferred embodiment and the accompanying drawings wherein.

DETAILED DESCRIPTION OF THE PREFERRED EMBODIMENTS

Referring to FIGS. 1A, 1B, 2A and 2B, a liquid level indicating means comprises a high level indicating device 1 and an impulse indicating device 20, the high level indicating device 1 and the impulse indicating device 20 respectively comprised of pipe bodies 11;25, magnetic switches 12;22, and floating element 14;impulse element 24. The pipe body 11 has an inner flange 13 on the inner wall where near the bottom thereof. The side of the pipe body 11 includes a fixing device 112 for fixing the pipe body on the desired place. The pipe body 11 of the high level indicating device 1 has air holes 111 on the side thereof (shown in FIG. 3). The pipe body 25 of the impulse indicating device 20 has a connecting pipe 21 connected to the side thereof. The magnetic switches 12;22 are located on the top of the pipe bodies and connected to the control circuit with electric wires 121;221.

Figure 1A:
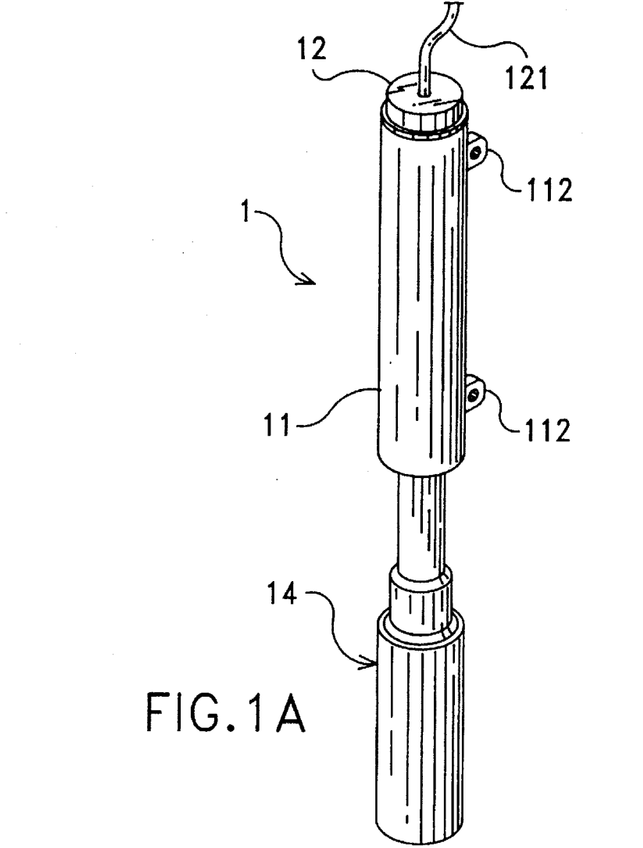
FIG. 1A is a perspective view of the high level indicating device of the present invention.
Figure 1B:
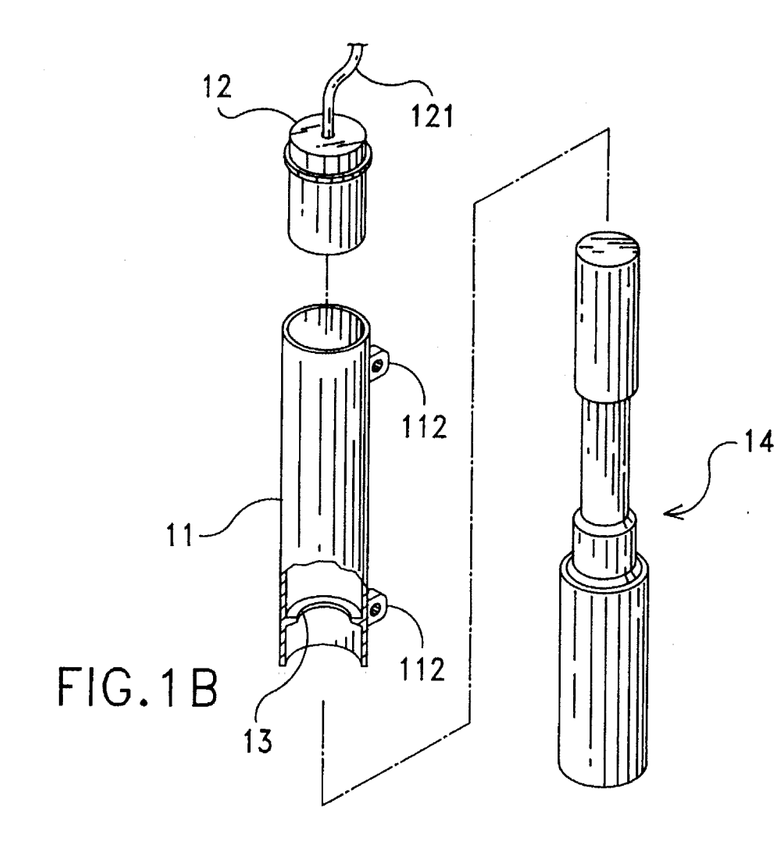
FIG. 1B is an exploded view of the high level indicating device of the present invention.
Figure 2A:
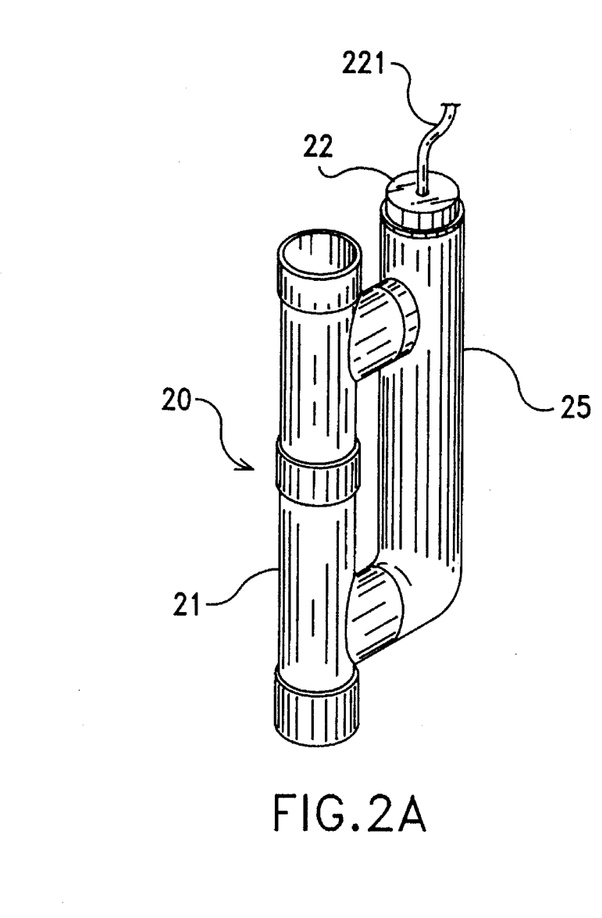
FIG. 2A is a perspective view of the impulse indicating device of tile present invention.
Figure 2B:
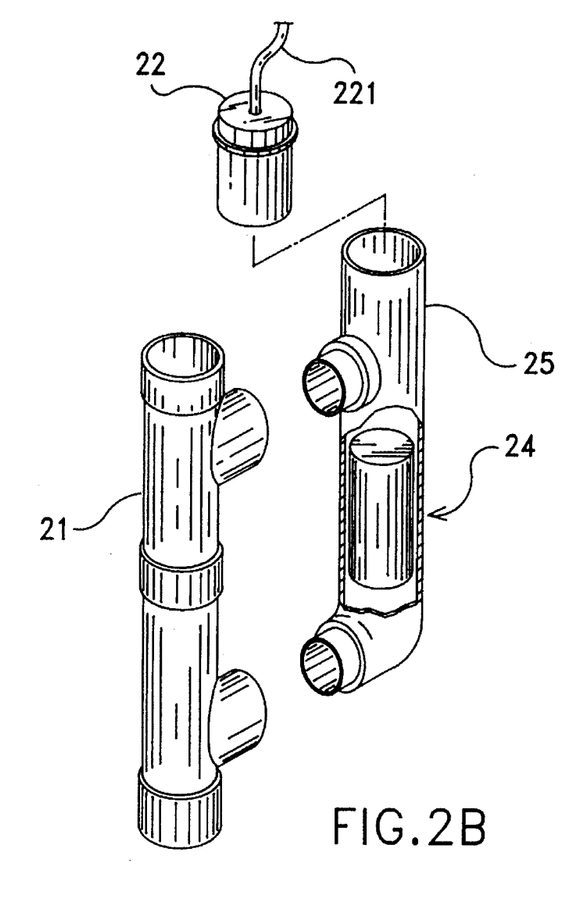
FIG. 2B is an exploded view of the impulse indicating device of the present invention.
Figure 3:
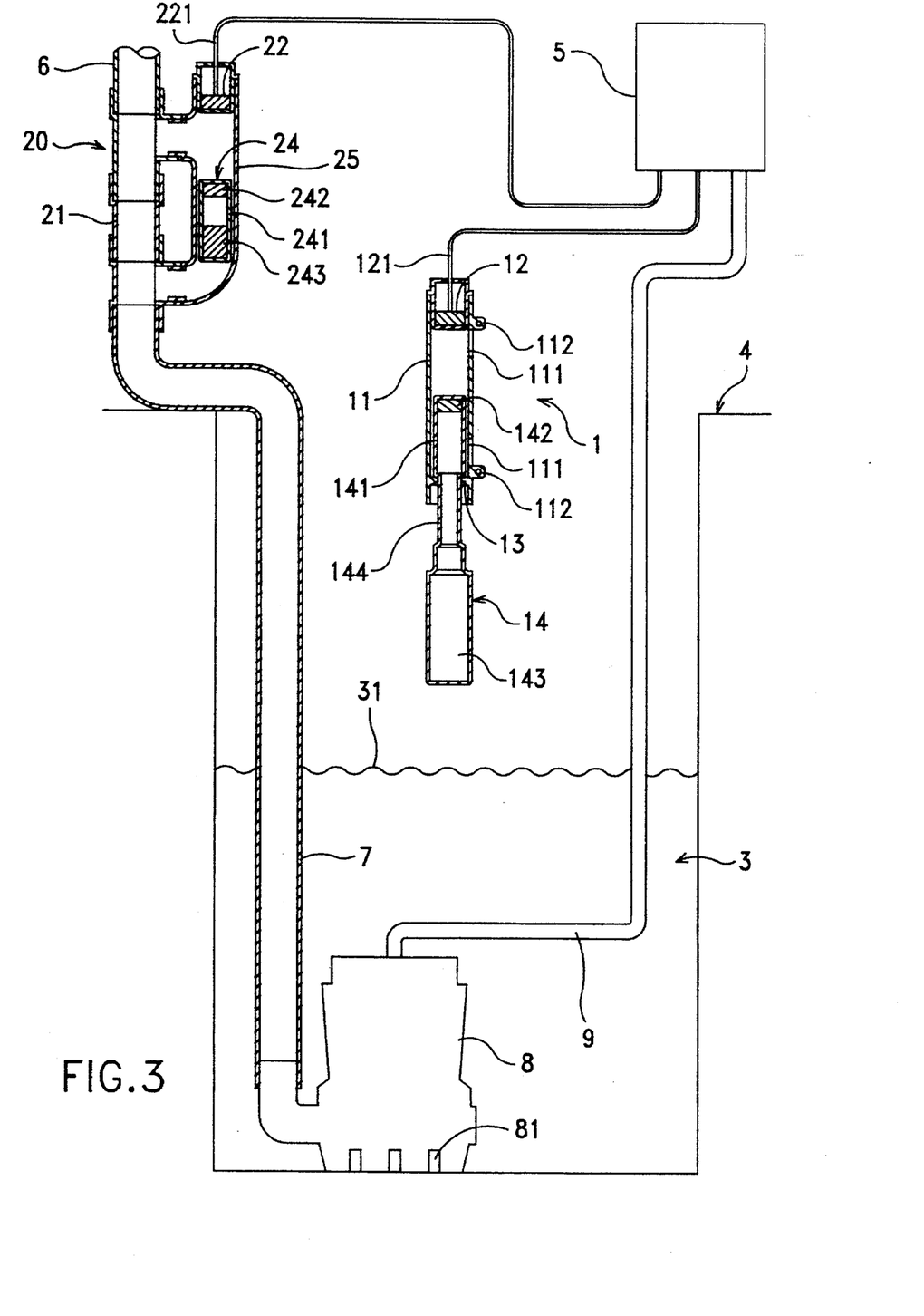
FIG. 3 is a sectional assembly view according to the preferred embodiment of the present invention.
Figure 4:
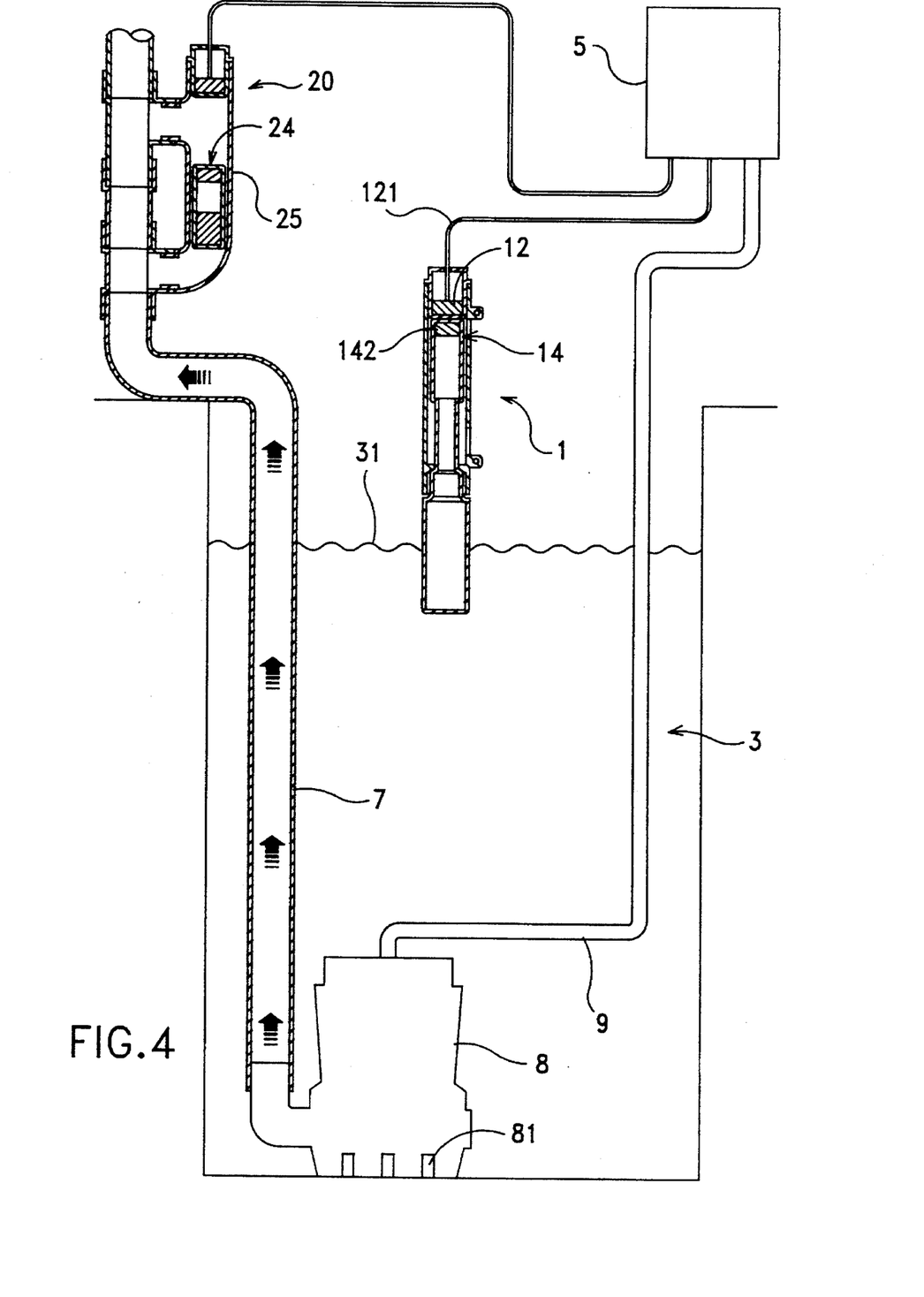
FIGS. 4,5,6 and 7 are a series of drawings showing the serial actions of the present invention.
Figure 5:
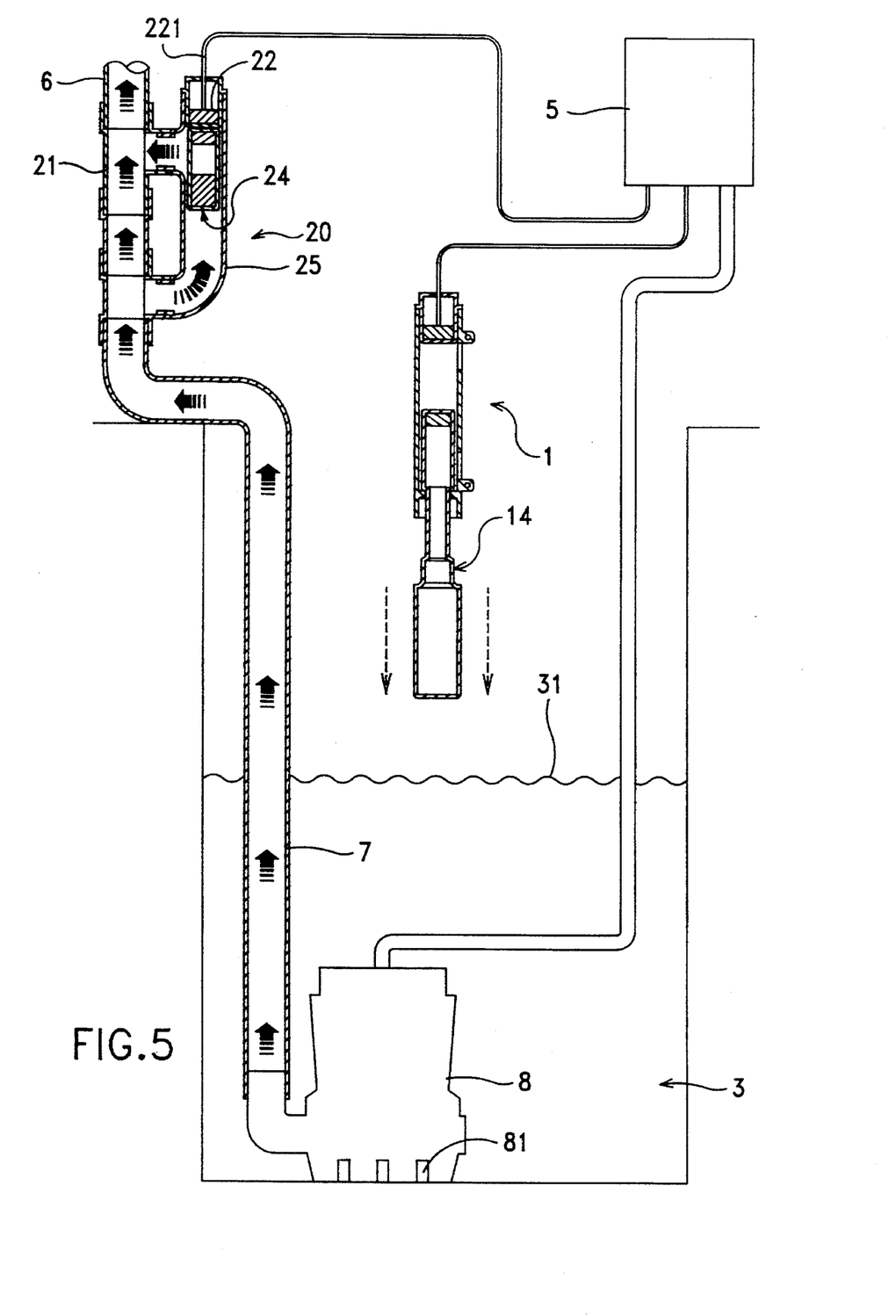
Figure 6:
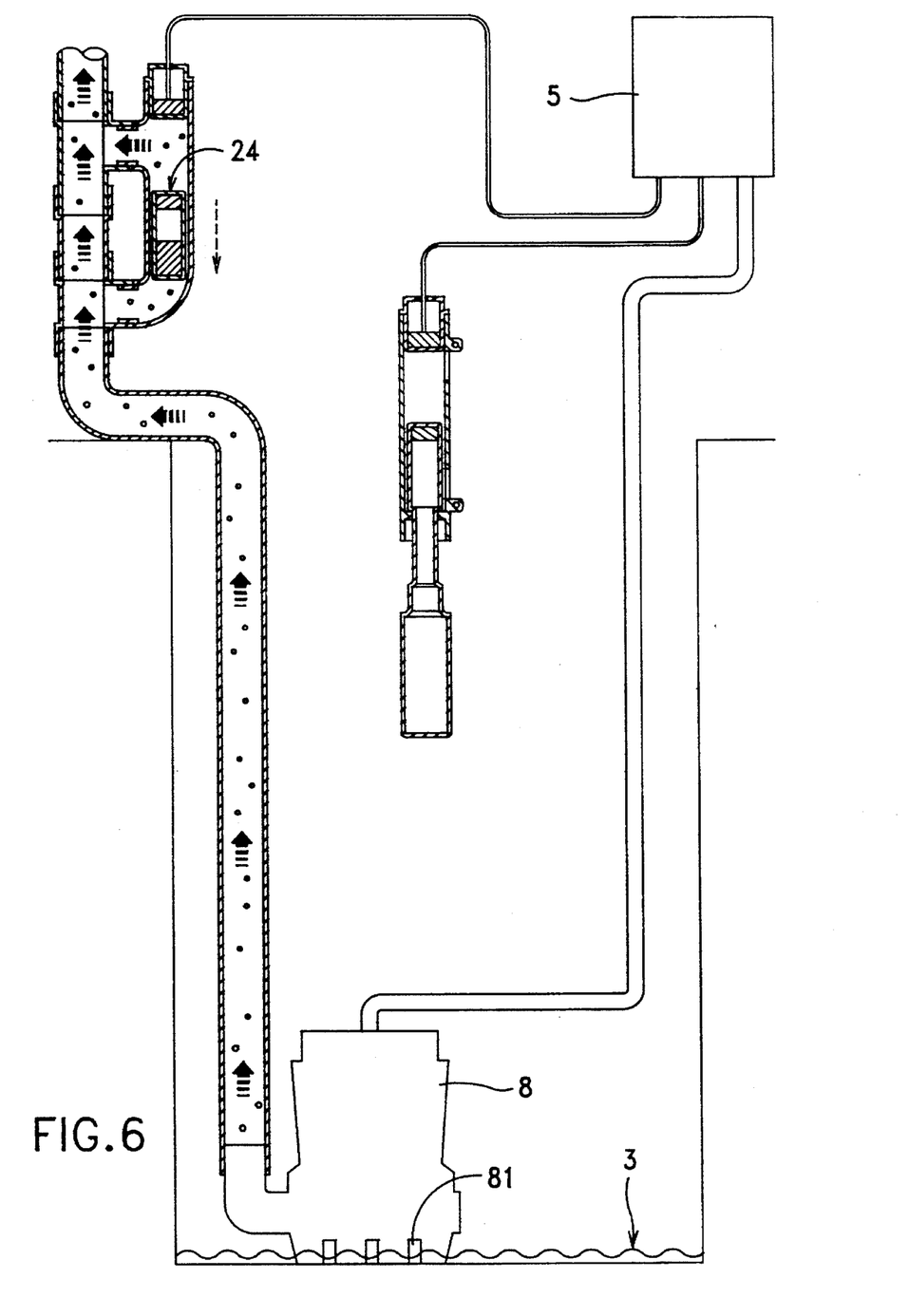
Figure 7:
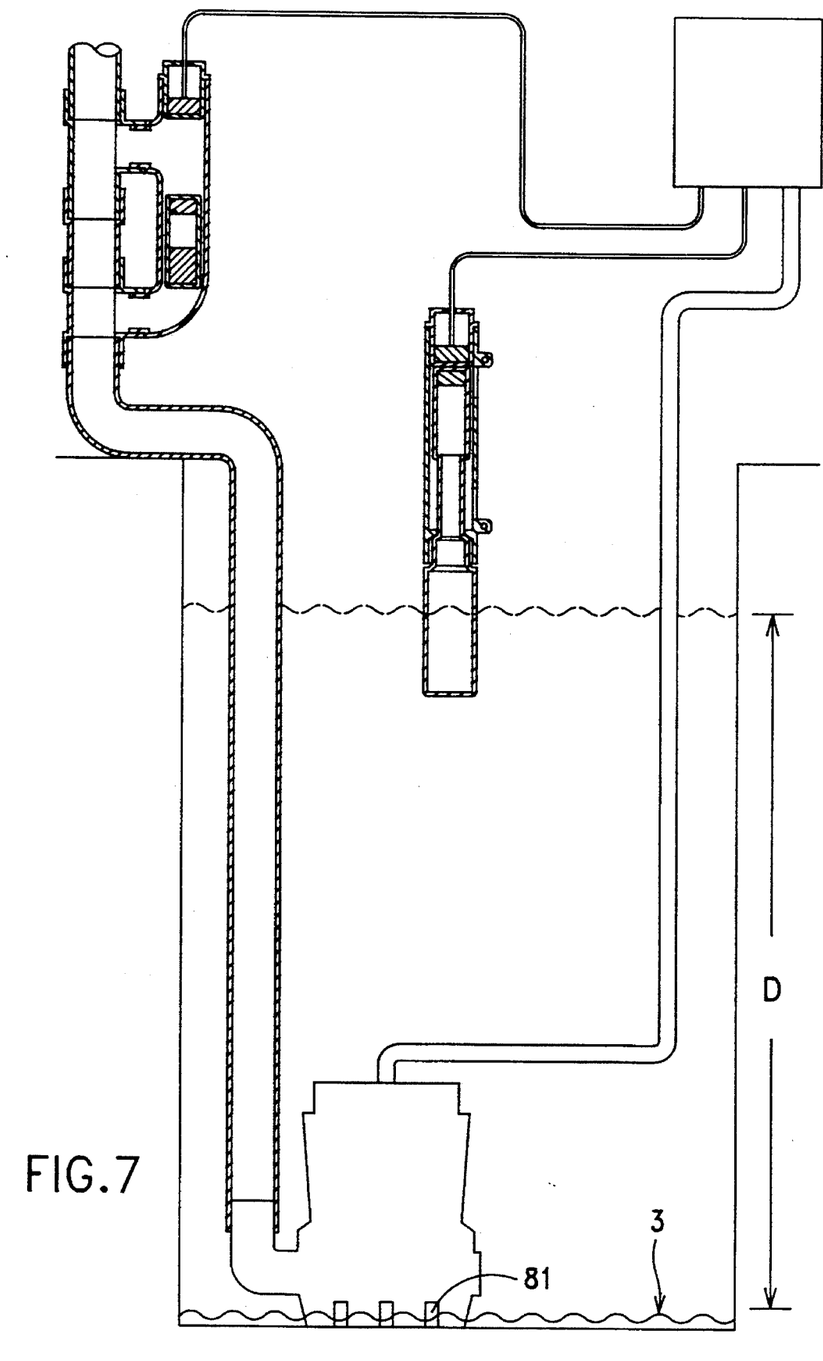

Referring to FIGS. 1B, 2B and 3, both the floating element 14 of the high level indicating device 1 and the impulse element 24 of the impulse indicating device 20 are formed into enclosures 141;241, the enclosures 141;241 having magnets 142;242 at the inner top thereof, and the impulse element 24 of the impulse indicating device 20 having a weight means 243 at the bottom thereof. The enclosure 141 of the floating element 14 includes an upper part, a lower part 143 and a neck part 144. The neck part 144 causes the upper part of the high level indicating device 1 retained between the magnetic switch 12 and the inner flange 13, and the outside diameter of the lower part 143 is bigger than the inside diameter of the inner flange 13 causing the lower part 143 of the floating element 14 always disposed outside the pipe body 11, therefore, it can avoid the liquid 3 flowing into the pipe body 11 and the error actions caused by the impurity of the liquid. The high level indicating device 1 is fixed on the liquid tank 4 with a fixing device 112, and the magnetic switches 12;22 are connected to a control circuit where is inside the control box 5 with electric wires 121;221. The bottom of the connecting pipe 21 is connected to a sump pump 8 through a delivery pipe 7, the sump pump 8 located on the bottom of the liquid tank 4 and connected to the control box 5 with an electric wire 9. The floating element 14 of the high level indicating device 1 and the impulse element 24 of the impulse indicating device 20 are not raised until a liquid surface 31 buoys and contacts the floating element 14. Also, the high level indicating device 1 can use another fixing device which is fastened to the top of the high level indicating device 1.

Referring to FIGS. 4,5,6 and 7, these drawings show actions of the present invention. When the magnet 142 of the floating element 14 of the high level indicating device 1 buoys to contact the magnetic switch 12 by the buoyancy of the liquid 3, a signal is sent to the control box 5 through the electric wire 121, and the sump pump 8 is started by a signal from the control circuit, through the electric wire 9, the liquid 3 is delivered to the impulse indicating device 20 by the sump pump 8 through the delivery pipe 7, the impulse element 24 of the impulse indicating device 20 is not raised until the liquid 3 in the delivery pipe 7 raises and contacts thereto, when the magnet 242 of the impulse element 24 of the impulse indicating device 20 buoys to contact the magnetic switch 22, a signal is sent to the control box 5 through the electric wire 221, the action control of sump pump 8 is changed to the impulse indicating device 20 to deliver the liquid 3 out through the connecting pipe 21 and outlet pipe 6. Therefore, even the liquid surface 31 moves down and the floating element 14 returns to bottom, the liquid 3 is delivered out continuously until the liquid surface 31 downs to the level of a suction port 81 of the sump pump 8. As tile sump pump 8 simultaneously sucks liquid and air, the impulse of the liquid 3 which force on the impulse element 24 is not enough to support it, then the impulse element 24 falls down and separates from the magnetic switch 22, therefore, the sump pump 8 slops to deliver liquid out.

Figure 8A:
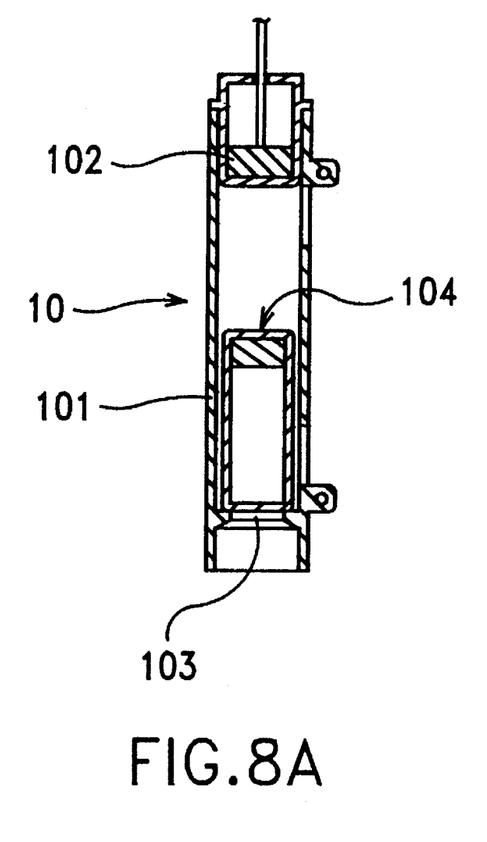
FIG. 8A shows another embodiment of the high lever indicating device of the present invention.
Figure 8B:
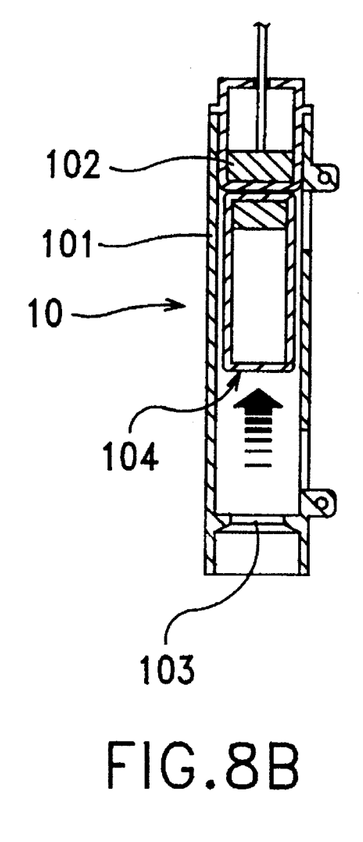
FIG. 8B shows the action of the high level indicating device of FIG. 8A.

Referring to FIGS. 8A and 8B these two drawings show another embodiment of the high level indicating device, the floating element 104 of the high level indicating device 10 wholly retains between the magnetic switch 102 and the inner flange 103 of the pipe body 101, this embodiment is suited for delivering pure liquid that will not choke the high level indicating device 10.

Figure 9A:
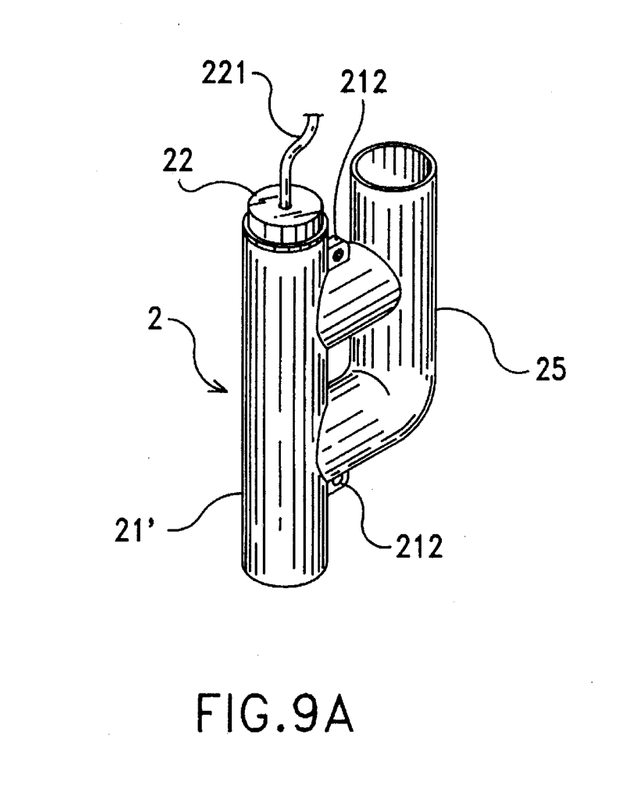
FIG. 9A is a perspective view of the impulse indicating device for another embodiment of the present invention.
Figure 9B:
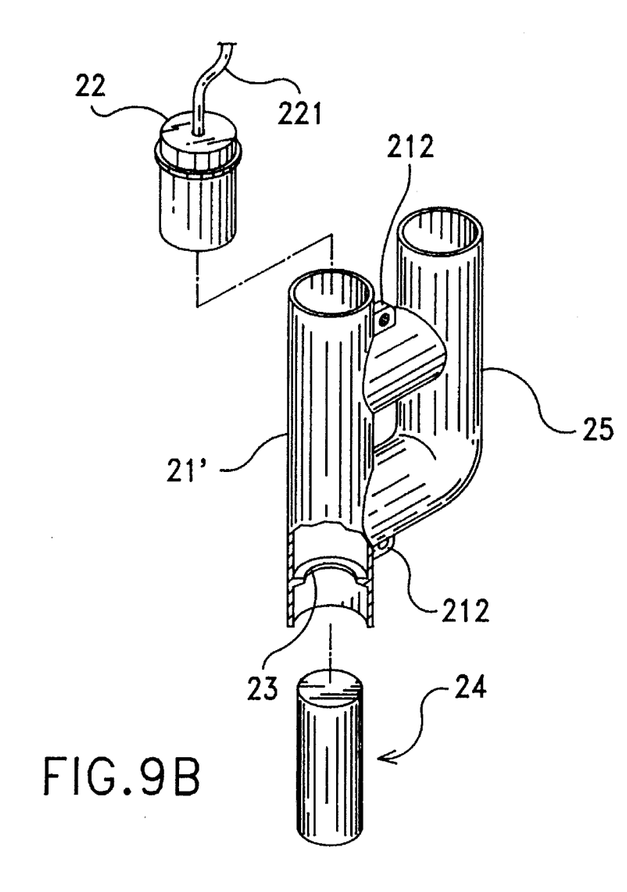
FIG. 9B is an exploded view of the impulse indicating device of FIG. 9A.

Referring to FIGS. 9A and 9B these two drawings show another embodiment of the impulse indicating device, the magnetic switch 22 is located on the top of the connecting pipe 21' and the impulse element 24 is retained between the magnetic switch 22 and the inner flange 23 in the connecting pipe 21', and the liquid is delivered out through the pipe body 25.

Figure 10:
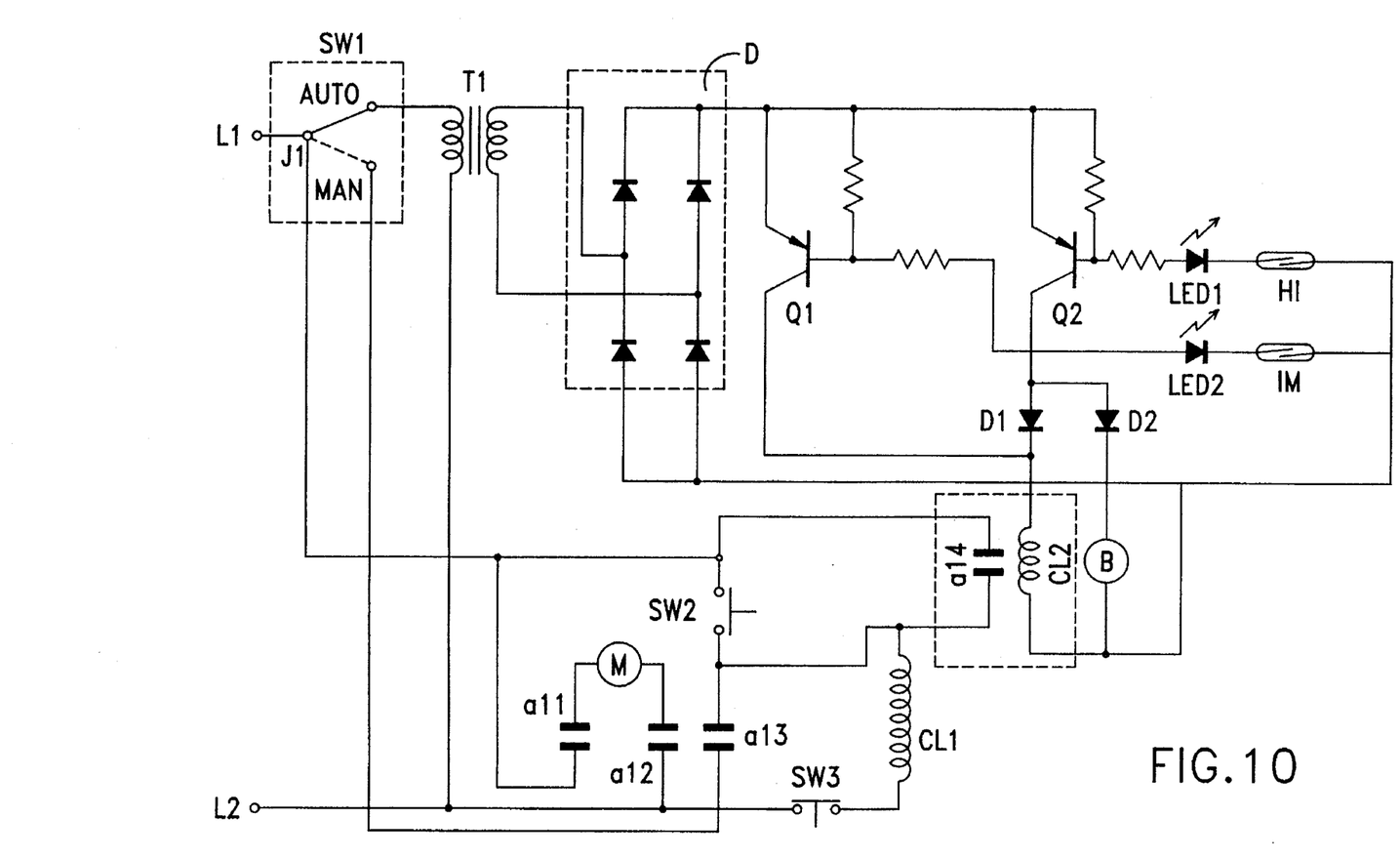
FIG. 10 is a control circuit diagram of the present invention.

Referring to FIG. 10 it is a control circuit diagram of the present invention, when a switch SW1 is set to manual action (point MAN), the coil CL1 is magnetized as a user depresses the starting switch SW2, then the normally open a11;a12;a13 are closed, the sump pump M starts working until the user depresses the switch SW3.

When the switch SW1 is set to automatic action (point AUTO) and the magnetic switch HI of the high level indicating device is closed, simultaneously, the LED1 lighting and the transistor Q2 on cause the coil CL2 magnetized through the diode D1, the normally open a14 is closed and the alarm B alarms through the diode D2, the coil CL1 is magnetized then the normally open a11;a12;a13 are closed, the sump pump M starts working to deliver liquid out through the delivery pipe 7, as the liquid buoys the impulse element of the impulse indicating device to contact the magnetic switch, so the magnetic switch IM and is closed, the LED2 lighting and the transistor Q1 are on, the current for magnetizing the coil CL2 controlled by the transistor Q1 and the sump pump M are continuous working. When the liquid surface downs and the magnetic switch HI opened, the LED1 to darken and the transistor Q2 off then the alarm B stops alarming. As the liquid surface downs to the suction port of the sump pump M, the magnetic switch IM of the impulse indicating device opened, the LED2 darken, and the transistor Q1 off cause the coil CL2 demagnetized then the normally open a14 is opened, therefore the coil CL1 demagnetized caused the normal open a11;a12;a13 opened and the sump pump M stop working.

While only a few embodiments of the present invention have been shown and described, it will be understood that various modifications and changes could be made without departing from the spirit and scope of the invention.

What is claimed is:

1. A liquid level controller comprising:

a control circuit;

a control box covering said control circuit;

a sump pump having a third electric wire connected to said control circuit; and a liquid level indicating means comprising: a high level indicating device, said high level indicating device having a first pipe body, a first magnetic switch, and a floating element, said first pipe body having an inner flange on inner wall where near bottom thereof, said first pipe body of said high level indicating device having an air hole on the side thereof, said first magnetic switch located on the top of said first pipe body of said high level indicating device and connected to said control circuit with a first electric wire, said floating element of said high level indicating device formed into a first enclosure, said first enclosure having a first magnet at inner top thereof, said first enclosure of said floating element including an upper part, a lower part and a neck part, said upper part of said high level indicating device retained between said first magnetic switch and said inner flange, and the outside diameter of said lower part is bigger than the inside diameter of said inner flange, said lower part of said floating element disposed outside said first pipe body;

an impulse indicating device, said impulse indicating device having a second pipe body, a second magnetic switch, and an impulse element, said second pipe body of said impulse indicating device having a connecting pipe connected to the side thereof, the bottom of said connecting pipe is connected to said sump pump through a delivery pipe, said second magnetic switch located on the top of said second pipe body of said impulse indicating device and connected to said control circuit with a second electric wire, said impulse element of said impulse indicating device formed into a second enclosure, said second enclosure having a second magnet at inner top thereof, said impulse element of the impulse indicating device having a weight means at the bottom thereof.

2. The liquid level controller of claim 1, wherein said high level indicating device has a fixing device thereon.

3. A liquid level controller comprising:

a control circuit;

a control box covering said control circuit;

a sump pump having a third electric wire connected to said control circuit; and a liquid level indicating means comprising:

a high level indicating device, said high level indicating device having a first pipe body, a first magnetic switch, and a floating element, said first pipe body having an inner flange on inner wall where near bottom thereof, said first pipe body of said high level indicating device having an air hole on the side thereof, said first magnetic switch located on the top of said first pipe body of said high level indicating device and connected to said control circuit with a first electric wire, said floating element of said high level indicating device formed into a first enclosure, said first enclosure having a first magnet at inner top thereof, said floating element wholly retained between said first magnetic switch and said inner flange of said first pipe body, and the outside diameter of said floating element is bigger than the inside diameter of said inner flange; and an impulse indicating device, said impulse indicating device having a second pipe body, a second magnetic switch, and an impulse element, said second pipe body of said impulse indicating device having a connecting pipe connected to the side thereof, the bottom of said connecting pipe is connected to said sump pump through a delivery pipe, said second magnetic switch located on the top of said second pipe body of said impulse indicating device and connected to said control circuit with a second electric wire, said impulse element of said impulse indicating device formed into a second enclosure, said second enclosure having a second magnet at inner top thereof, said impulse element of the impulse indicating device having a weight means at the bottom thereof.

4. A liquid level controller comprising:

a control circuit;

a control box covering said control circuit;

a sump pump having a third electric wire connected to said control circuit; and a liquid level indicating means comprising:

a high level indicating device, said high level indicating device having a first pipe body, a first magnetic switch, and a floating element, said first pipe body having a first inner flange on inner wall where near bottom thereof, said first pipe body of said high level indicating device having an air hole on the side thereof, said first magnetic switch located on the top of said first pipe body of said high level indicating device and connected to said control circuit with a first electric wire, said floating element of said high level indicating device formed into a first enclosure, said first enclosure having a first magnet at inner top thereof, said floating element wholly retained between said first magnetic switch and said inner flange of said first pipe body, and the outside diameter of said floating element is bigger than the inside diameter of said first inner flange; and an impulse indicating device, said impulse indicating device having a connecting pipe, a second magnetic switch, and an impulse element, said connecting pipe of said impulse indicating device having a second pipe body connected to the side thereof, said connecting pipe having a second inner flange on inner wall, the bottom of said connecting pipe is connected to said sump pump through a delivery pipe, said second magnetic switch located on the top of said connecting pipe of said impulse indicating device and connected to said control circuit with a second electric wire, said impulse element of said impulse indicating device formed into a second enclosure, said second enclosure having a second magnet at inner top thereof, said impulse element of the impulse indicating device having a weight means at the bottom thereof, and said impulse element retained between said second magnetic switch and said second inner flange of the connecting pipe.

* * * * *